US012674099B2

(12) United States Patent
Dreillard et al.

(10) Patent No.: US 12,674,099 B2
(45) Date of Patent: Jul. 7, 2026

(54) RENEWABLE DIESEL PRODUCTION FROM CATALYTIC PYROLYSIS FEEDSTOCK

(71) Applicant: IFP ENERGIES NOUVELLES, Rueil-Malmaison (FR)

(72) Inventors: Matthieu Dreillard, Rueil-Malmaison (FR); Bertrand Fanget, Rueil-Malmaison (FR); Frederic Feugnet, Rueil-Malmaison Cedex (FR); Jérôme Bonnardot, Rueil-Malmaison (FR); Charles Sorensen, Pearl River, NY (US); Anthony Rocco Cartolano, Pearl River, NY (US)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 213 days.

(21) Appl. No.: 18/711,440

(22) PCT Filed: Nov. 10, 2022

(86) PCT No.: PCT/EP2022/081445
§ 371 (c)(1),
(2) Date: May 17, 2024

(87) PCT Pub. No.: WO2023/088771
PCT Pub. Date: May 25, 2023

(65) Prior Publication Data
US 2025/0019593 A1    Jan. 16, 2025

Related U.S. Application Data

(60) Provisional application No. 63/280,323, filed on Nov. 17, 2021.

(51) Int. Cl.
| | |
|---|---|
| *C10G 1/00* | (2006.01) |
| *B01J 29/06* | (2006.01) |
| *B01J 35/64* | (2024.01) |
| *C10G 1/08* | (2006.01) |
| *C10G 67/02* | (2006.01) |

(52) U.S. Cl.
CPC .............. *C10G 1/002* (2013.01); *B01J 29/06* (2013.01); *B01J 35/647* (2024.01); *C10G 1/083* (2013.01); *C10G 1/086* (2013.01); *C10G 67/02* (2013.01); *C10G 2300/1011* (2013.01); *C10G 2300/1059* (2013.01); *C10G 2300/1096* (2013.01); *C10G 2300/301* (2013.01); *C10G 2300/4006* (2013.01); *C10G 2300/4012* (2013.01); *C10G 2300/4081* (2013.01); *C10G 2300/70* (2013.01); *C10G 2400/04* (2013.01)

(58) Field of Classification Search
CPC ........ C10G 1/002; C10G 1/083; C10G 1/086; C10G 67/02; C10G 2300/1011; C10G 2300/1059; C10G 2300/1096; C10G 2300/301; C10G 2300/4006; C10G 2300/4012; C10G 2300/4081; C10G 2300/70; C10G 2400/04; B01J 29/06; B01J 35/647
See application file for complete search history.

(56) References Cited

U.S. PATENT DOCUMENTS

| | | | |
|---|---|---|---|
| 4,029,716 A | 6/1977 | Kaeding | |
| 8,277,643 B2 | 10/2012 | Huber et al. | |
| 8,864,984 B2 | 10/2014 | Huber et al. | |
| 9,169,442 B2 | 10/2015 | Huber et al. | |
| 9,315,739 B2 * | 4/2016 | Smith | B01D 17/04 |
| 9,382,489 B2 * | 7/2016 | Ramirez-Corredores | C10G 3/44 |
| 9,447,350 B2 * | 9/2016 | Ramirez-Corredores | C10G 3/42 |
| 9,790,179 B2 | 10/2017 | Tanzio et al. | |
| 10,370,601 B2 | 8/2019 | Sorensen, Jr. et al. | |
| 10,427,069 B2 * | 10/2019 | Sanchez | C10G 33/04 |
| 10,767,127 B2 | 9/2020 | Sorensen | |
| 10,822,562 B2 | 11/2020 | Sorensen | |
| 2009/0294324 A1 | 12/2009 | Brandvold et al. | |
| 2012/0152801 A1 | 6/2012 | Bozzano et al. | |
| 2016/0289573 A1 | 10/2016 | Dupuy | |
| 2016/0312125 A1 | 10/2016 | Linck et al. | |
| 2019/0382672 A1 | 12/2019 | Sorensen | |
| 2020/0165527 A1 | 5/2020 | Digne et al. | |

OTHER PUBLICATIONS

International Search Report PCT/EP2022/081445 dated Feb. 27, 2023 (pp. 1-4).

* cited by examiner

*Primary Examiner* — Kyle Armstrong
(74) *Attorney, Agent, or Firm* — Csaba Henter; MILLEN, WHITE, ZELANO & BRANIGAN

(57) ABSTRACT

The present invention provides a catalytic pyrolysis process for the production of renewable diesel fuel. The present invention provides a process for preparing renewable diesel fuel, comprising preparing renewable diesel fuel by a) fractionating a mixture comprising renewable aromatics to produce a first fraction boiling at 180° C. to 350° C. at atmospheric conditions, and a fraction boiling below the boiling point of the first fraction, blending at least a portion of the first fraction with at least one distillate cut having lower aromatic content than the first fraction, and b) hydrogenating a blend of the first fraction and distillate cut having lower aromatic content to produce a hydrogenated fraction comprising a renewable diesel fuel.

18 Claims, 3 Drawing Sheets

RENEWABLE DIESEL PRODUCTION FROM CATALYTIC PYROLYSIS FEEDSTOCK

FIELD OF THE INVENTION

The present invention relates to an improved catalytic pyrolysis process. In particular, it relates to a process to produce renewable diesel fuel from renewable feedstocks via catalytic pyrolysis and hydrogenation of a naphthalene-rich oil phase. This hydrogenation step is conducted in coprocessing with any external distillate cuts which can be conventional petroleum materials or bio-sourced ones in order to properly adjust the aromatic concentration of the mixture, mostly brought by the naphthalene rich oil phase resulting from catalytic pyrolysis process, making possible the exotherm management of the hydrogenation and leading to a final diesel product on specifications. The adjustment of the ending boiling point of the naphthalene rich oil phase is highly important to make possible the flowing of the residual part in addition to the meeting of the diesel fuel specifications.

BACKGROUND OF THE INVENTION

A modern oil refinery converts crude oil through numerous unit operations and conversion reactions into several individual streams, including diesel, jet fuel, and gasoline blendstocks that are stored in separate tanks so they can be blended together in calculated proportions to obtain various grades of "finished" fuel grades that are used in cars, trucks, and aircraft.

In the United States there are additional laws that require gasoline, jet, and diesel fuels to contain renewable-sourced blendstocks between specific minimum and maximum levels. Today those limits are set by Congress via the Renewable Fuels Standards ("RFS"). The RFS mandates that 21 billion gallons of advanced biofuels will need to be produced by 2022. A part of these advanced biofuels will be fungible transportation fuels such as gasoline, jet fuel, and diesel derived from biomass. Efforts continue on producing such fuels from biomass to meet the mandate and it is perceived that there will be a strong demand for gasoline, jet, and diesel fuels produced economically from biomass. The chief renewable-sourced gasoline blendstock used in the U.S. to meet the gasoline blending requirement is ethanol, produced largely from corn or sugar fermentation. A minor, but growing contribution to the nation's renewable gasoline pool is so-called "second generation" cellulosic ethanol made from non-food biomass such as corn stover.

As described in the US DOE Office of Energy Efficiency and Renewable Energy (EERE) report "Sustainable Aviation Fuel: Review of Technical Pathways," published in September 2020, the 106-billion-gallon global (21-billion-gallon domestic) commercial jet fuel market is projected to more than double by 2050.

Renewable diesel fuel is a biofuel that has to present the same chemical properties as petroleum diesel fuel. At the present time, renewable diesel is mostly produced from vegetable oil, fat and to a lower extent from ligno cellulosic biomass material such as wood, sawdust, crop residues, and switchgrass. It is produced through different processes like hydrotreating, gasification, and pyrolysis.

It is qualified as an advanced biofuel under the Renewable Fuel Standard (RFS) Program and has to meet the American Society for Testing and Materials (ASTM) specification ASTM D975 for petroleum diesel. Diesel fuel consists mainly of paraffins, aromatics and naphthenes. The hydrocarbons of diesel contain typically 12-20 carbon atoms with boiling range between 17° and 360° C. The principal measure of diesel fuel quality is its cetane number. A cetane number is a measure of the delay of ignition of a diesel fuel. A higher cetane number indicates that the fuel ignites more readily when sprayed into hot compressed air. European (EN 590 standard) road diesel has a minimum cetane number of 51. Fuels with higher cetane numbers, normally "premium" diesel fuels with additional cleaning agents and some synthetic content, are available in some markets.

In the United States, petroleum-derived diesel is composed of about 75% saturated hydrocarbons (primarily paraffins including normal, iso, and cycloparaffins), and 25% aromatic hydrocarbons (including naphthalenes and alkylbenzenes).

Depending on the routes of production, post treatments are required to bring the renewable diesel at the right composition and specifications, mandatory condition to be sold as commercial diesel.

As renewable diesel contains low levels of sulfur, the emissions of sulfur oxides and sulfates, major components of acid rain, are low. Use of renewable diesel also results in reductions of unburned hydrocarbons, carbon monoxide (CO), and particulate matter. CO emissions using biodiesel are substantially reduced, on the order of 50% compared to most petroleum derived diesel fuels. The exhaust emissions of particulate matter from biodiesel have been found to be 30% lower than overall particulate matter emissions from petroleum derived diesel. The exhaust emissions of total hydrocarbons (a contributing factor in the localized formation of smog and ozone) are up to 93% lower for renewable diesel than diesel fuel.

In 2019 total U.S. renewable diesel consumption was about 900 million gallons.

Biomass pyrolysis has been developing as an alternative for providing renewable fuels and fuel blendstocks. The product of biomass pyrolysis is a complex and unstable bio oil whose composition varies widely depending on feedstock and pyrolysis conditions, and that comprises hundreds of compounds including a plethora of oxygenates. Generally, bio oil contains 20-40% by weight oxygen and a small percentage of sulfur-containing materials. Hydrotreatment of the bio oil, including hydrodeoxygenation (HDO), hydrodesulfurization (HDS), olefin hydrogenation and aromatic saturation, is required to make the oil suitable as a blendstock or stand-alone fuel. While hydrotreating is well developed for petroleum feedstocks that contain almost no oxygen, the challenges of hydrotreating bio oil are more substantial. To date the preferred processes for hydrotreating bio oil are multi-stage systems that require high pressure of hydrogen, precious metal catalysts, and multiple unit operations (see for example, "Process Design and Economics for the Conversion of Lignocellulosic Biomass to Hydrocarbon Fuels: Fast Pyrolysis and Hydrotreating Bio-oil Pathway," S. Jones et al, PNNL-23053, November 2013, available electronically at http://www.osti.gov/bridge).

Catalytic pyrolysis of biomass has been developed as an improved thermal process for upgrading biomass to chemicals and fuels. The process involves the conversion of biomass in a fluid bed reactor in the presence of a catalyst. The catalyst is usually an acidic, microporous crystalline material, usually a zeolite. The zeolite is active for the upgrading of the primary pyrolysis products of biomass decomposition, and converts them to aromatics, olefins, CO, $CO_2$, char, coke, water, and other useful materials. The aromatics include benzene, toluene, xylenes, (collectively BTX), and naphthalene/alkyl naphthalene, among other aromatics. The olefins include ethylene, propylene, and lesser amounts of higher molecular weight olefins. BTX aromatics are desirable products due to their high value and ease of transport. Toluene and xylenes are particularly desirable as gasoline components due to their high octane rating and energy density. Heavier aromatics are suitable precursors to jet and diesel fuels. When produced under proper conditions, the products of catalytic pyrolysis are very low in oxygen content.

US Patent Application US2020/0165527 describes isolation of a naphthalene-rich oil phase from a biomass catalytic pyrolysis process. No mention of hydrotreating or hydrogenating the naphthalene-rich oil phase or other materials containing polynuclear aromatics is made.

There are various technologies developed to convert biomass derived feedstocks to diesel fuel or to jet fuel, such as dehydration of alcohols, hydrogenation of oils, gasification, and conversion of sugars. All of these technologies involve multiple processing steps to create the renewable fuel, none describe a one-step catalytic pyrolysis of woody biomass to create renewable fuel precursors. Many such processes are described in detail in "Review of Biojet Fuel Conversion Technologies," W-C Wang, et al, Technical Report NREL/TP-5100-66291, July 2016, wherein "solid-based feedstocks are converted into biomass-derived intermediate through gasification, into alcohols through biochemical or thermochemical processes, into sugars through biochemical processes, and into bio-oils through pyrolysis processes." Wang indicates that "Bio-oil is a mixture of oxygenated organic species containing carbons ranging from C1 to C21+." None of the processes considered by Wang is capable of converting solid feedstocks directly into very low oxygen content materials that merely need removal of residual heteroatoms such as S, N, and O, and saturation of specific aromatic fractions to produce a renewable diesel fuel or diesel fuel blendstock.

In U.S. Pat. Nos. 8,277,643; 8,864,984; 9,790,179; 10,370,601, 10,767,127; and 10,822,562, each incorporated herein by reference in its entirety, apparatus and process conditions suitable for catalytic pyrolysis are described.

In light of current commercial practices and the disclosures of art, a simple economical process for producing renewable fuels and particularly renewable diesel fuel that meet technical and regulatory limitations by use of a single step catalytic pyrolysis of biomass is needed. The present invention provides such a process and the resulting diesel fuel compositions and chemicals.

SUMMARY OF THE INVENTION

Various aspects of the present invention include production of diesel fuel from renewable feedstocks via catalytic pyrolysis and hydrogenation of selected catalytic pyrolysis products or other processes. The present invention provides for this in an economical improved process.

In a first aspect, the invention provides an improved process for preparing renewable diesel fuel comprising the steps of: feeding a mixture comprising renewable aromatics from a catalytic pyrolysis process to a fractionation system to recover a fraction, such as one boiling at or above 180° C. at atmospheric conditions, and a fraction boiling at or below 180° C. at atmospheric conditions, blending at least a portion of the recovered fraction of step a) boiling at or above 180° C. with any sources of distillate cuts presenting less aromatic content in order to limit the total aromatic content of the blend and processing the mixture under hydrogenation conditions to produce a hydrogenated fraction, and recovering a renewable fuel from the hydrogenated fraction of step b) in a product recovery system.

More particularly, the present invention comprises the steps of:
- a. feeding biomass, catalyst composition, and transport fluid to a catalytic pyrolysis process fluidized bed reactor maintained at reaction conditions to manufacture a raw fluid product stream,
- b. feeding the raw fluid product stream of step a) to a solids separation and stripping system to produce separated solids and a fluid product stream,
- c. feeding the fluid product stream of step b) to a fractionation system in order to recover a fraction at or above 180° C.; preferably such as one boiling at 180° C. to 350° C., much preferably such as on boiling at 200 to 320° C.
- d. mixing the fraction of step c) boiling at or above 180° C. with any sources of distillate cuts presenting less aromatic content than the fraction in order to dilute the aromatic of the blend and properly adjusting the aromatic concentration of the blend below 60 wt %, or below 50%, or below 40%; wherein the sources of external distillate cuts are defined by a boiling point range compatible with diesel specification and presenting other molecules than aromatics like naphthenes, paraffines and others. As an example but not limiting to, these external distillate cuts could be a Straight Run Gasoil coming from the atmospheric distillation of the crude oil or a mixture of a Straight Run Gasoil and Light Cycle Oil (LCO) coming from the fluid catalytic cracking unit. Both materials are typically the main source of diesel in a refinery after adequate up grading. Other distillate cuts can be considered as any bio sourced distillate like HVO or resulting from fat and biomass conversion. Their addition to the naphthalene rich oil base has to reduce the total aromatic content of the blend.
- e. hydrogenating at least a portion of the blend generated in step d) with hydrogen at hydrogenation conditions to produce a hydrogenated fraction,
- f. recovering fuel, such as diesel fuel comprising naphthenes from the hydrogenated fraction of step e) in a product recovery system.

Boiling ranges presented in this invention refer to the boiling ranges under modest pressure operation, typically at or near atmospheric pressure, e.g. 0.1 Mpa.

Glossary

As used herein, the term "biomass" has its conventional meaning in the art and refers to any organic source of energy or chemicals that is renewable. Its major components can be: (1) trees (wood) and all other vegetation; (2) agricultural products and wastes (corn stover, fruit, garbage ensilage, etc.); (3) algae and other marine plants; (4) metabolic wastes (manure, sewage), and (5) cellulosic urban waste, and carbonaceous urban waste. Examples of biomass materials are described, for example, in Huber, G. W. et al, "Synthesis of Transportation Fuels from Biomass: Chemistry, Catalysts, and Engineering," Chem. Rev. 106, (2006), pp. 4044-4098.

Biomass is conventionally defined as the living or recently dead biological material that can be converted for use as fuel or for industrial production. The criterion as biomass is that the material should be recently participating in the carbon cycle so that the release of carbon in the combustion process results in no net increase of carbon participating in the carbon cycle averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes or byproducts that can be burned as fuel or converted to chemicals, including municipal wastes, green waste (the biodegradable waste comprised of garden or park waste, such as grass or flower cuttings and hedge trimmings), byproducts of farming including animal manures, food processing wastes, sewage sludge, and black liquor from wood pulp or algae. Biomass excludes organic material which has been transformed by geological processes into substances such as coal, oil shale or petroleum. Biomass is widely and typically grown from plants, including *miscanthus*, spurge, sunflower, switchgrass, hemp, corn (maize), poplar, willow, sugarcane, and oil palm (palm oil) with the roots, stems, leaves, seed husks and fruits all being potentially useful. Processing of the raw material for introduction to the processing unit may vary according to the needs of the unit and the form of the biomass. Biomass can be distinguished from fossil-derived carbon by the presence of $^{14}$C in amounts significantly above that found in fossil fuels as determined by ASTM method D 6866-06.

Biomass used in the present process can most preferably be solid materials chosen from among wood, forestry waste, corn stover, agricultural solid waste, municipal solid waste, digestate, food waste, animal waste, carbohydrate, lignocellulosic material, xylitol, glucose, cellobiose, hemicellulose, lignin, and combinations thereof.

The term "renewable" refers to a substance that is derived from biomass; preferably containing at least 50 mass % C derived from biomass, or at least 80 mass % C derived from biomass, and typically 90 to 100% of the C being derived from biomass.

The term "naphthalene-rich oil" resulting from biomass conversion in catalytic pyrolyzing as used herein includes naphthalene, methyl-naphthalenes (e.g., 1-methyl naphthalene, 2-methyl naphthalene, etc.), dimethyl-naphthalenes (e.g., 1,5-dimethylnaphthalene, 1,6-dimethylnaphthalene, 2,5-dimethylnaphthalene, etc.), ethyl-naphthalenes, other polyaromatic compounds (e.g., anthracene, 9,10-dimethyl-anthracene, pyrene, phenanthrene, etc.) and aromatics and polyaromatics that contain a heteroatom (e.g., oxygen, sulfur, nitrogen, etc.). The naphthalene-rich oil is a stream typically boiling in a temperature range from about 180 to about 575° C. This stream is resulting from the biomass conversion in the catalytic pyrolysing process.

Naphthalene rich cut comprises at least 25, or at least 35, or at least 40, or from 25 to 90, or from 35 to 80, or from 40 to 75 wt % sum of naphthalene, substituted naphthalenes, naphthalenols, methyl naphthalenols, and naphthalene diols, and at least 3, or at least 5, or at least 6, or from 3 to 15, or from 5 to 10, or from 6 to 8 weight % xylenols, and less than 15, or less than 10, or less than 5, or from 0.01 to 20, or from 1 to 15, or from 5 to 13 weight % the sum of phenanthrene, anthracene, and other materials.

As used herein, any source of distillate cuts are defined by a boiling point range compatible with diesel specification and presenting less aromatics than the renewable naphthalene rich cuts resulting from biomass conversion in the catalytic pyrolyser process.

These distillate cuts may present molecules like naphthenes, paraffines and others. As an example, but not limiting to, these distillate cuts could be a Straight Run Gasoil coming from the atmospheric distillation of the crude oil or a mixture of a Straight Run Gasoil and Light Cycle Oil (LCO) coming from the fluid catalytic cracking unit. Both materials are typically the main source of diesel in a refinery after adequate up grading. Other distillate cuts can be considered as any bio sourced distillate like HVO or resulting from fat and biomass conversion. Their addition to the naphthalene rich oil base has to reduce the total aromatic content of the blend.

The term "off gas" as used herein includes H2, CO, CO2 N2 and hydrocarbons containing 1 to 6 atoms of carbon (e.g., methane, ethane, ethylene, propane, propylene, n-butane, isobutane, isobutene, I-butene, 2-butene, pentane, pentene, hexane, hexene, etc.).

The term "tars" or "tar" as used herein is a stream typically boiling in a temperature range of from about 310 to about 575° C., the stream is usually dark brown or black, bituminous, and viscous.

As used herein, the terms "aromatics" or "aromatic compound" refer to a hydrocarbon compound or compounds comprising one or more aromatic groups such as, for example, single aromatic ring systems (e.g., benzyl, phenyl, etc.) and fused polycyclic aromatic ring systems (e.g., naphthyl, 1,2,3,4-tetrahydronaphthyl, etc.). Examples of aromatic compounds include, but are not limited to, benzene, phenol, benzenediols, benzenetriols, toluene, cresols, methoxy benzene, methylbenzene-diols, ethyl benzene, xylenes, styrene, 2,3-dihydro-benzofuran, methyl-benzenemethanol, dimethyl phenols, ethyl-phenols, dimethyl-benzenediols, ethylcatechol, resorcinol monoacetate, benzofuran, 3,4-dihydroxyethylbenzene, phorone, ethyl-toluenes, propyl-benzenes, trimethyl-benzenes, benzene-1-ethyl-4-methoxy, phenol-2,3,6-trimethyl, phenol-4-ethyl-2-methoxy, α-methyl styrene, methyl-styrenes, 1-propenyl benzene, 2-propenyl benzene, indane, 2,3-dihydro-1H-inden-5-ol, 1,2-indandiol, methyl 3-hydroxy-2-methylbenzoate, 4-(2-propenyl)-phenol, (2e)-3-phenylprop-2-enal, indene, phenol-2-(2-propynyl), methyl-benzofurans, 1H-indenol, 2-methyl benzothiophene, 1-methyl-4-propylbenzene, 1-methyl-4-(propan-2-yl)benzene, 4-isopropylbenzyl alcohol, 5-isopropyl-2-methylphenol, carvacrol, 2,3,5,6-tetramethyl-1,4-benzenediol, 1,2,3,4-tetrahydronaphthalene, methyl indanes, 2,4-dimethyl styrene, 1-ethenyl-4-ethylbenzene, 2-methyl 1-propenyl benzene, 2,3-dihydro-5-methyl-1H-indene, 5-methoxyindan, 1,5-dihydroxy-1,2,3,4-tetrahydronaphthalene, benzene, (1-methyl-2-cyclopropen-1-yl), 1-methyl indene, 2-methyl indene, 3-methyl indene, 4-methyl indene, 1,2-dihydro naphthalene, 1,4-dihydro naphthalene, 5,8-dihydro-1-naphthalenol, 2-methyl-1-indanone, 2,3-dimethyl benzofuran, naphthalene, naphthalenols, pentamethyl-benzene, methyl-tetralins, 2,2-dimethyl indane, 1H-indene 1-ethyl-2,3-dihydro, dimethyl-indenes, ethyl-indenes, dihydro-methylnaphthalenes, methyl naphthalenes, methyl-naphthols, 1-phenylcyclohexene, ethyl-naphthalenes, dimethyl-naphthalenes, biphenyl, acenaphthene, dibenzofuran, 2-(1-methylethyl)-naphthalene, trimethyl-naphthalenes, trimethyl azulene, 3-methyl-1,1-biphenyl, fluorene, 2-phenanthrenyl-1,2,3,4-tetrahydro, 9h-fluorene-1-methyl-, 9H-fluorene-2-methyl, 9H-fluorene-4-methyl, anthracene, phenanthrene, 3-phenanthrol, methyl-anthracenes, 2,6-dimethyl phenanthrene, 2-phenyl-naphthalene, pyrene, 1-benzyl naphthalene, 7H-benzo-[c]-fluorene, 11H-benzo-[b]-fluorene, 1-methyl-7-isopropyl phenanthrene, 1 4-dimethyl-2-phenyl naphthalene, chrysene, aniline, pyridine, pyyrole.

Single ring and/or higher ring aromatics may also be produced in some embodiments. Aromatics also include single and multiple ring compounds that contain heteroatom substituents, i.e., phenol, cresol, benzofuran, aniline, indole, etc. Renewable aromatics are those materials above that have been prepared from renewable resources such as biomass.

The term "naphthenes" as used herein includes compounds having at least one saturated paraffinic ring, such as hydrocarbon ring compounds of the general formula, $C_nH_2n$, including cyclopentane, cyclohexane, and cycloheptane, alkylated cycloparaffins such as methyl-, ethyl-, dimethyl-, propyl-, trimethyl-, and butyl-cyclohexanes, cyclopentanes, and cycloheptanes, and multi-ring cycloparaffins such as decalin, alkylated decalins, tetralin, and alkylated tetralins.

As used herein, the terms "olefin" or "olefin compound" (a.k.a. "alkenes") have their ordinary meaning in the art, and refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed ring) or of an open chain grouping, respectively. In addition, olefins may include any suitable number of double bonds (e.g., monoolefins, diolefins, triolefins, etc.). Examples of olefin compounds include, but are not limited to, ethene, propene, allene (propadiene), 1-butene, 2-butene, isobutene (2-methylpropene), butadiene, and isoprene, among others. Examples of cyclic olefins include cyclopentene, cyclohexene, and cycloheptene, among others. Aromatic compounds such as toluene are not considered olefins; however, olefins that include aromatic moieties are considered olefins, for example, benzyl acrylate or styrene.

As used herein, the term "oxygenate" includes any organic compound that contains at least one atom of oxygen in its structure such as alcohols (e.g., methanol, ethanol, etc.), acids (e.g., acetic acid, propionic acid, etc.), aldehydes (e.g., formaldehyde, acetaldehyde, etc), esters (e.g., methyl acetate, ethyl acetate, etc.), ethers (e.g., dimethyl ether, diethyl ether, etc.), aromatics with oxygen containing substituents (e.g., phenol, cresol, benzoic acid, naphthol, etc.), cyclic ethers, acids, aldehydes, and esters (e.g. furan, furfural, etc.), and the like.

As used herein, the terms "phenolic oil" and "oxygenated oil" include aromatics with oxygen containing substituents (e.g., phenol, m-cresol, o-cresol, p-cresol, xylenols, etc.) and other compounds from Bio-TCat reactor effluent typically boiling in the range from 80 to 220° C. (e.g. benzene, toluene, p-xylene, m-xylene, a-xylene, indane, indene, 2-ethyl toluene, 3-ethyl toluene, 4-ethyl toluene, 1,3,5-trimethyl benzene, 1,2,4-trimethyl benzene, 1,2,3-trimethyl benzene, ethylbenzene, styrene, cumene, propyl-benzene, naphthalene, etc). The phenolic oil and the oxygenated oil are streams typically boiling in a temperature range from 80 to 220° C.

As used herein, the terms "pyrolysis" and "pyrolyzing" have their conventional meaning in the art and refer to the transformation of a compound, e.g., a solid hydrocarbonaceous material, into one or more other substances, e.g., volatile organic compounds, gases and coke, by heat, preferably without the addition of, or in the absence of, molecular oxygen, i.e. $O_2$. Preferably, the volume fraction of oxygen present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Catalytic pyrolysis (also called catalytic fast pyrolysis or CFP) that involves the conversion of biomass in a catalytic fluid bed reactor to produce a mixture of aromatics, olefins, and a variety of other materials is a particularly beneficial pyrolysis process. Examples of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098, incorporated herein by reference. Products from a catalytic pyrolysis process may include materials such as benzene, phenol, benzenediols, benzenetriols, toluene, cresols, methoxy benzene, methylbenzene-diols, ethyl benzene, xylenes, styrene, 2,3-dihydro-benzofuran, methyl-benzenemethanol, dimethyl phenols, ethyl-phenols, dimethyl-benzenediols, ethyl-catechol, resorcinol monoacetate, benzofuran, 3,4-dihydroxyethylbenzene, phorone, ethyl-toluenes, propyl-benzenes, trimethyl-benzenes, benzene-1-ethyl-4-methoxy, phenol-2,3,6-trimethyl, phenol-4-ethyl-2-methoxy, α-methyl styrene, methyl-styrenes, 1-propenyl benzene, 2-propenyl benzene, indane, 2,3-dihydro-1H-inden-5-ol, 1,2-indandiol, methyl 3-hydroxy-2-methylbenzoate, 4-(2-propenyl)-phenol, (2e)-3-phenylprop-2-enal, indene, phenol-2-(2-propynyl), methyl-benzofurans, 1H-indenol, 2-methyl benzothiophene, 1-methyl-4-propylbenzene, 1-methyl-4-(propan-2-yl)benzene, 4-isopropylbenzyl alcohol, 5-isopropyl-2-methylphenol, carvacrol, 2,3,5,6-tetramethyl-1,4-benzenediol, 1,2,3,4-tetrahydronaphthalene, methyl indanes, 2,4-dimethyl styrene, 1-ethenyl-4-ethylbenzene, 2-methyl 1-propenyl benzene, 2,3-dihydro-5-methyl-1H-indene, 5-methoxyindan, 1,5-dihydroxy-1,2,3,4-tetrahydronaphthalene, benzene, (1-methyl-2-cyclopropen-1-yl), 1-methyl indene, 2-methyl indene, 3-methyl indene, 4-methyl indene, 1,2-dihydro naphthalene, 1,4-dihydro naphthalene, 5,8-dihydro-1-naphthalenol, 2-methyl-1-indanone, 2,3-dimethyl benzofuran, naphthalene, naphthalenols, pentamethyl-benzene, methyl-tetralins, 2,2-dimethyl indane, 1H-indene 1-ethyl-2,3-dihydro, dimethyl-indenes, ethyl-indenes, dihydro-methylnaphthalenes, methyl naphthalenes, methyl-naphthols, 1-phenylcyclohexene, ethyl-naphthalenes, dimethyl-naphthalenes, biphenyl, acenaphthene, dibenzofuran, 2-(1-methylethyl)-naphthalene, trimethyl-naphthalenes, trimethyl azulene, 3-methyl-1,1-biphenyl, fluorene, 2-phenanthrenyl-1,2,3,4-tetrahydro, 9h-fluorene-1-methyl-, 9H-fluorene-2-methyl, 9H-fluorene-4-methyl, anthracene, phenanthrene, 3-phenanthrol, methyl-anthracenes, 2,6-dimethyl phenanthrene, 2-phenyl-naphthalene, pyrene, 1-benzyl naphthalene, 7H-benzo-[c]-fluorene, 11H-benzo-[b]-fluorene, 1-methyl-7-isopropyl phenanthrene, 1 4-dimethyl-2-phenyl naphthalene, chrysene, aniline, pyridine, pyyrole, among others.

Hydroprocessing, the reaction of organic materials with hydrogen, includes the processes of hydrotreating, hydrogenation, and hydrocracking. As used herein, the term hydrotreatment refers to a relatively mild hydroprocessing process for reacting organic feed materials with hydrogen used to remove at least 90% of contaminants such as nitrogen, sulfur, and oxygen from organic liquid fractions. These contaminants can have detrimental effects on the equipment, the catalysts, and the quality of the finished product. Hydrotreating also saturates a substantial portion of the olefinic portions of many materials to the corresponding material where the olefinic portion has been converted to its paraffinic counterpart, for example 1-hexene may be saturated to hexane, and styrene may be saturated to ethylbenzene. Hydrotreating does not significantly saturate aromatic portions of materials such as benzene to cyclohexane, i.e. the saturation of aromatic rings is less than 10% of the aromatic rings in the material. Hydrotreating is done prior to processes such as hydrogenation so that the hydrogenation catalyst is not contaminated by the contaminants in untreated feedstock. Hydrotreating is also used prior to catalytic cracking or hydrocracking to reduce sulfur and improve product yields, and to upgrade petroleum fractions into finished jet fuel, diesel fuel, and heating fuel oils.

Suitable hydrotreating catalysts for use in the hydrotreater are known conventional hydrotreating catalysts and include those which are comprised of at least one Group VIII metal (i.e., iron, cobalt, nickel, ruthenium, rhodium, palladium, osmium, iridium, or platinum, preferably iron, cobalt, or nickel, more preferably cobalt and/or nickel) and at least one Group VI metal (preferably molybdenum or tungsten or both) on a high surface area support material, preferably alumina or silica or a mixture of alumina and silica. Other suitable hydrotreating catalysts include zeolitic catalysts, as well as noble metal catalysts where the noble metal is selected from one or more of rhodium, ruthenium, iridium, palladium, and platinum. It is within the scope of the processes herein that more than one type of hydrotreating catalyst be used in the same reaction vessel. The Group VIII metal is typically present in an amount ranging from about 0.5 to about 20 weight percent, preferably from about 0.5 to about 10 weight percent. The Group VI metal will typically be present in an amount ranging from about 1 to 25 weight percent, and preferably from about 1 to 12 weight percent. While the above describes some exemplary catalysts for hydrotreating, other hydrotreating and/or hydrodesulfurization catalysts may also be used depending on the particular feedstock and the desired effluent quality. Catalysts and hydrotreating conditions can be selected to achieve less than 10%, or less than 5%, or less than 2%, or less than 1% hydrogenation of the aromatic carbon-carbon bonds in the aromatic rings in the feed to the hydrotreater.

The reaction conditions employed for hydrotreatment will depend in part on the particular reactor design selected and concentrations of the individual species, but reaction temperatures of 200° C. to 400° C. and hydrogen pressures of 1.5 MPa (15 bar) to 10 MPa (100 bar) are normally preferred. Advantageously, this contacting step may be carried out at a liquid hourly space velocity greater than 0.1 hr-1. The volumetric ratio of gas to liquid (the "G:L ratio") in the hydrotreater at reactor operating conditions can range from 0.1 to 20:1, more typically 0.1 to 10:1.

As used herein, the term hydrogenation refers to a hydroprocessing process for reacting organic feed materials with hydrogen to saturate a substantial portion of the aromatic rings in a feed mixture. Hydrogenation may convert materials with more than one aromatic ring to materials wherein one or more of the aromatic rings have been saturated. For example, conversion of naphthalene with hydrogen to tetralin, or decalin, or a mixture of tetralin and decalin, is a hydrogenation process. Typically, the conversion of aromatic rings in a material to produce naphthenes is at least 15%, or at least 25% or at least 35%, or from 15 to 80%, or from to 70%, or from 35 to 60% of the aromatic rings in the mixture. Typical process conditions for hydrogenation include temperatures of at least 280° C., or at least 300° C., or at least 320° C., or from 280 to 450° C., or from 300 to 400° C., or from 320 to 350° C. Typical hydrogen pressures are from 1.5 to 10 MPa. Preferably two operating modes can be implemented:

From 1.5 to 4.0 MPa, preferably from 2.5 to 4.0 MPa,
From 4.0 to 10 MPa, preferably from 7.0 to 10 MPa.

Typical liquid hourly space velocities for hydrogenation are at least 0.5, or at least 1, or at least 2, or no more than 10, or no more than 5, or no more than 3, or from 0.5 to 5, or 1 to 4, or 2 to 3 hr-1 where the liquid hourly space velocity is the ratio of the volume of liquid feed fed over the catalyst per hour to the volume of catalyst in the reactor. Typical hydrogen circulation rates for hydrogenation are at least 70, or at least 100, or at least 300, or from 70 to 1000, or 7000 to 800, or 100 to 700 Nm3 of H2 per m3 of liquid feed. Typical catalysts for hydrogenation include CoMo on alumina support, NiMo on alumina support, or combinations thereof.

Catalyst components useful in the context of this invention can be selected from any catalyst known in the art, or as would be understood by those skilled in the art. Catalysts promote and/or effect reactions. Thus, as used herein, catalysts lower the activation energy (increase the rate) of a chemical process, and/or improve the distribution of products or intermediates in a chemical reaction (for example, a shape selective catalyst). Examples of reactions that can be catalyzed include: dehydration, dehydrogenation, hydrogenation, isomerization, oligomerization, cracking, hydrogen transfer, aromatization, cyclization, decarbonylation, decarboxylation, aldol condensation, molecular cracking and decomposition, combinations thereof, and other reactions. Catalyst components can be considered acidic, neutral, or basic, as would be understood by those skilled in the art.

DETAILED DESCRIPTION OF THE INVENTION

As a result of extensive research in view of the above, we have found that we can economically and effectively conduct a catalytic pyrolysis process to enhance manufacture of valuable fuels and chemical products by way of a series of sequential steps.

An embodiment of the present improved process comprises steps of:

a. feeding biomass, such as, for example, that provided from renewable sources of organic materials, catalyst composition, such as comprising one or more crystalline molecular sieves, for example, those characterized by a molar silica to alumina ratio (SAR) greater than 12 and a Constraint Index (CI) from 1 to 12, and transport fluid to a fluidized bed reactor maintained at reaction conditions, for example, a temperature from 300 to 1000° C. and pressure from 0.1 to 1.5 MPa, to manufacture a raw fluid product stream, b. feeding the raw fluid product stream of step a) to a solids separation and stripping system, to produce separated solids and a fluid product stream, c. feeding the fluid product stream of step b) to a fractionation system in order to recover a fraction such as one boiling at 180° C. to 350° C. preferably such as one boiling at 180° C. to 320° C., much preferably such as on boiling at 200 to 320° C. Starting boiling point is dictated regarding diesel specification and ending boiling point is adjusted to get a processable residue part. Too high ending point will impact the viscosity of the residual product leading to poor flowability properties.

g. mixing the fraction of step c) boiling at or above 180° C. with any sources of distillate cuts presenting less aromatic content than the fraction in order to dilute the aromatic of the blend and properly adjusting the aromatic concentration of the blend below 60 wt %, or below 50%, or below 40%; wherein the sources of external distillate cuts are defined by a boiling point range compatible with diesel specification and presenting other molecules than aromatics like naphthenes, paraffines and others. As an example but not limiting to, these external distillate cuts could be a Straight Run Gasoil coming from the atmospheric distillation of the crude oil or a mixture of a Straight Run Gasoil and Light Cycle Oil (LCO) coming from the fluid catalytic cracking unit. Both materials are typically the main source of diesel in a refinery after adequate up grading. Other distillate cuts can be considered as any bio sourced distillate like HVO or resulting from fat and biomass conversion. Their addition to the naphthalene rich oil base has to reduce the total aromatic content of the blend.

d. hydrogenating at least a portion of the blend generated in step d) with hydrogen at hydrogenation conditions to produce a hydrogenated fraction, e. recovering fuel, such as diesel fuel, comprising less than 0.4 weight % olefins, less than ppm (parts per million) by weight sulfur, less than 10 ppm by weight nitrogen, and less than 1 weight % oxygen, from the hydrogenated fraction of step f) in a product recovery system.

Embodiments of the invention include the novel fuel recovered by step e) and mixtures thereof with other fuels. Hydrotreating and hydrogenation of a portion of a biomass catalytic pyrolysis aromatics can efficiently hydrogenate C10-C16 aromatic components to produce a renewable fuel. The key defining parameter for efficiently producing this material is to remove 3-ring species from the feed to the hydrogenation, so as to avoid fouling and coking of the catalyst. This can be done by limiting the ending boiling point of the distilled product so as to minimize the presence of compounds such as phenanthrene, anthracene, and related compounds.

In one embodiment of the invention the renewable fuel comprises at least 50, or at least 75, or at least 90, or from 50 to 99, or from 75 to 95% by weight hydrocarbons with from 10 to 16 carbon atoms.

In a further aspect, the invention provides a diesel fuel that comprises from 0.1 to 90, or 1 to 70, or 1 to 50, or 1 to 20, or 0.1 to 10 volume %, or at least 0.1, or at least 5, or at least 10, or at least 20 volume %, of the renewable fuel.

CATALYTIC PYROLYSIS DESCRIPTION

Figure 1:
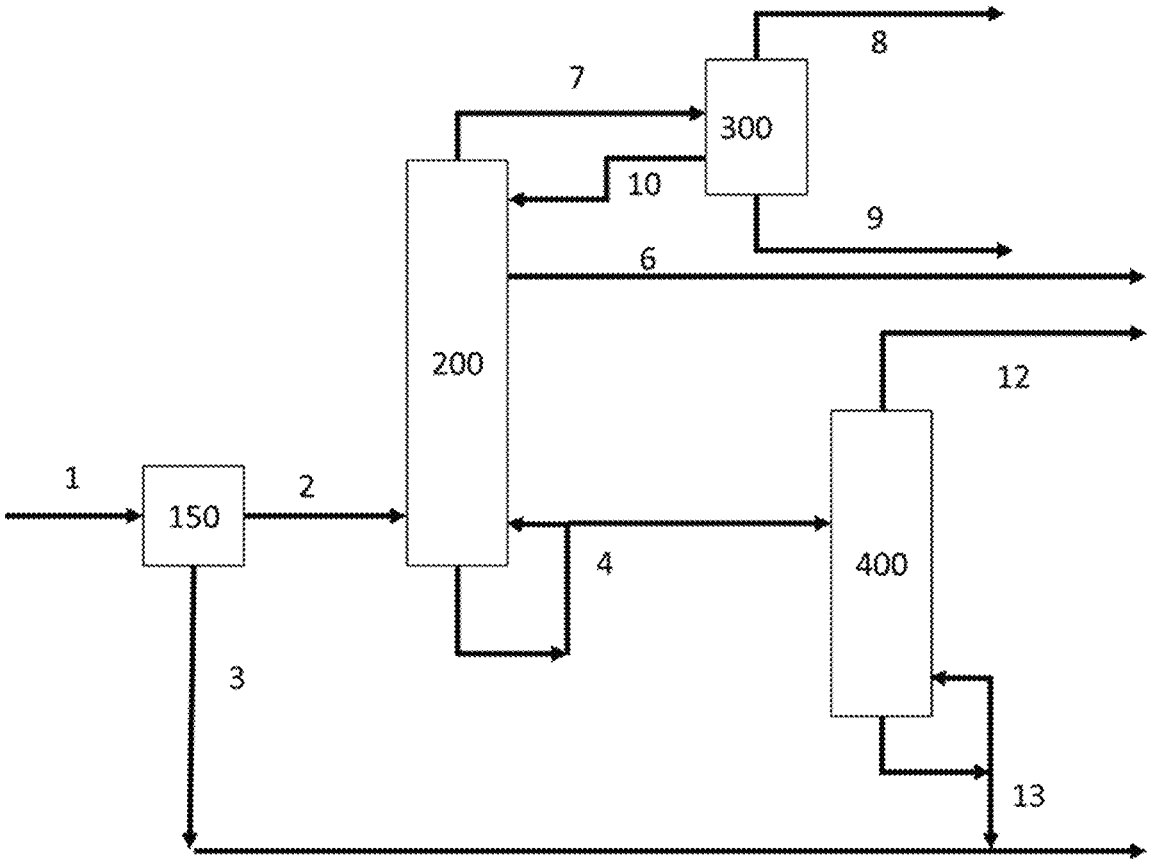
FIG. 1 shows a block flow illustration of various features of the inventive process.

Several embodiments of the invention are depicted in FIGS. 1, wherein stream 1 is preferably derived from the Bio-TCat™ process. Examples of apparatus and process conditions suitable for the Bio-TCat™ process are described in U.S. Pat. Nos. 8,277,643, 8,864,984, 9,169,442, 9,790, 179, 10,370,601, 10,767,127; and 10,822,562, each incorporated herein by reference. Conditions for Bio-TCat™ conversion of biomass may include one or a combination of the following features (which are not intended to limit the broader aspects of the invention): biomass treatment; a catalyst composition; that catalyst composition optionally comprising a metal; a fluidized bed, circulating bed, moving bed, or riser reactor; a fluidizing fluid; an operating temperature in the range of 300° C. to 1000° C., or 450° C. to 800° C., or 500° C. to 650° C., and a pressure in the range of 0.1 to 3.0 MPa (1 to 30 atm); and a solid catalyst/biomass mass ratio of from 0.1 to 40, or 2 to 20, or 3 to 10. Solid biomass may be fed to the reactor in a continuous or intermittent fashion. Solid catalyst may be regenerated in an oxidative process and in part returned to the reactor. Solid catalyst may be removed from the reactor, stripped with steam to displace organic materials and reactive gases, and then regenerated in a fluid bed catalyst regenerator by treatment with an oxygen containing gas, and in part returned to the reactor. To reduce the fraction of non-aromatic components in the products, and thereby benefit downstream separation and conversion technologies, the reaction severity in the Bio-TCat™ reactor can be increased. Methods to achieve greater reaction severity include higher reaction temperature, higher catalyst activity which can be achieved by higher fresh catalyst makeup and spent catalyst removal rates, or by changes to the catalyst (e.g. higher zeolite content, lower silica/alumina ratio, greater macro and meso-porosity, etc.), higher pressure, or longer residence time.

Biomass may not be available in a convenient form for processing in the fluid bed reactor of the Bio-TCat™ process. While solid biomass is the preferred feed, the solid biomass may comprise portions of liquids at ambient conditions. Solid biomass may be treated in any of a number of ways to make it more suitable for processing including cutting, chopping, chipping, shredding, pulverizing, grinding, sizing, drying, roasting, torrefying, washing, extracting, or some combination of these in any order to achieve the desired properties of the biomass feed as to size, moisture, sulfur and nitrogen impurities content, density, and metals content. Procedures to inhibit biomass clumping and agglomeration may be employed.

Following conversion in the fluid bed reactor, the products of the Bio-TCat™ process are recovered by a combination of solids separation, hydrocarbon quenching or cooling, gas-liquid separation, compression cooling, gas-liquid absorption, condensation of condensable compounds, or other methods known in the art, to produce a mixture of C4+ hydrocarbons including species having boiling points above those of gasoline or on-road diesel fuels. Distillation can be used to separate out the desired cut by boiling point range. The desired product cut can then be subject to hydrotreating to remove heteroatoms such as O, N, or S, and saturate olefins, and provide a first liquid stream.

In some embodiments the product mixture from the catalytic pyrolysis process comprises compounds from among 2-methyl naphthalene, naphthalene, indene, 1,2,4-trimethyl benzene, 1,5-dimethyl naphthalene, 2-methyl indane, 1-methylanthracene, -methyl styrene, 5-methyl indane indane 3-ethyl toluene, 1-methyl indene, 2-phenyl-naphthalene, anthracene, 2,3-dimethyl indene, 1-benzyl naphthalene, 2,6-dimethyl naphthalene, 4-ethyl toluene, 1,3-dimethyl indene, 9h-fluorene, 2-methyl-biphenyl, 1-methyl-4-propylbenzene, 1-methyl naphthalene, 1,7-dimethyl naphthalene, 9h-fluorene, 1-methyl-4-methyl indene, 2-(1-methylethyl)-naphthalene, 1h-indene 1-ethyl-2,3-dihydro, 1-phenylcyclohexene, n-propyl benzene, 11h-benzo-[b]-fluorene, 1,4-diethyl cyclohexane, 1,2,3-trimethyl benzene, 1-ethenyl-4-ethylbenzene, 1-methyl indane, 2,3,5-trimethyl-naphthalene, 3-methyl-1,1-biphenyl, propadienylcyclo-hexane, trimethyl azulene, phenanthrene, 2-ethyl naphthalene, fluorene, 1,2-dihydro naphthalene, 2-methyl indene, 1,2-dihydro 4-methylnaphthalene, 2,6-dimethyl phenanthrene, 1-methyl-7-isopropyl phenanthrene, 1,2-di-hydro 3-methylnaphthalene, 1,4,6-trimethylnaphthalene, 2-phenanthrenyl, 1,2,3,4-tetrahydro-4-methyl indane, 1,2,3, 4-tetrahydronaphthalene, 2,2-dimethyl indane, 1,4-dihydro naphthalene, 1-methyl-4-(propan-2-yl)benzene, 1 4-dimethyl-2-phenyl naphthalene, and oxygenates 3-phenanthrol, 1h-indenol, 1-naphthalenol (1-naphthol), 2-methyl-1-naph-thol, 2-methyl benzofuran, 2-acetyl-5-norbornene, dibenzo-furan, 2-naphthalenol, 7-methyl-1-naphthol, 5-isopropyl-2-methylphenol, 2,3-dihydro-1h-inden-5-ol, 5,8-dihydro-1-naphthalenol, 5-methoxyindan, 1,7,7-trimethylbicyclo [2.2.1]heptan-2-one, 2-(2-propynyl)-phenol, (2E)-3-phenylprop-2-enal (cinnamaldehyde), 2,3-dimethyl benzofuran, 2,3,6-trimethyl-phenol, and combinations thereof.

Catalysts for Catalytic Pyrolysis

For catalytic pyrolysis, useful catalysts include those containing internal porosity selected according to pore size (e.g., mesoporous and pore sizes typically associated with zeolites), e.g., average pore sizes of less than 10 nm (1 nm equals 10 Angstroms, Å), less than 5 nm, less than 2 nm, less than 1 nm, less than 0.5 nm, or smaller. In some embodiments, catalysts with average pore sizes of from 0.5 nm to 10 nm may be used. In some embodiments, catalysts with average pore sizes of between 0.5 nm and 0.65 nm, or between 0.59 nm and 0.63 nm may be used. In some cases, catalysts with average pore sizes of between 0.7 nm and 0.8 nm, or between 0.72 nm and 0.78 nm may be used.

The catalyst composition particularly advantageous in the catalytic pyrolysis fluidized bed reactor of the present invention comprises a crystalline molecular sieve characterized by a silica to alumina ratio (SAR) greater than 12 and a Constraint Index (CI) from 1 to 12. Non-limiting examples of these crystalline molecular sieves are those having the structure of ZSM-5, ZSM-11, ZSM-12, ZSM-22, ZSM-23, ZSM-35, ZSM-48, ZSM-50 or combinations thereof. As an embodiment, the catalyst composition comprises a crystalline molecular sieve characterized by an SAR from greater than 12 to 240 and a CI from 5 to 10, such as, for example, molecular sieves having the structure of ZSM-5, ZSM-11, ZSM-22, ZSM-23 or combinations thereof. The method by which CI is determined is described more fully in U.S. Pat. No. 4,029,716, incorporated by reference for details of the method.

Without limitation, some such and other catalysts can be selected from naturally-occurring zeolites, synthetic zeolites and combinations thereof. In certain embodiments, the catalyst may be a ZSM-5 zeolite catalyst, as would be understood as those skilled in the art. Optionally, such a catalyst can comprise acidic sites. Other types of zeolite catalysts include ferrierite, zeolite Y, zeolite beta, mordenite, MCM-22, ZSM-23, ZSM-57, SUZ-4, EU-1, ZSM-11, (S) AlPO-31, SSZ-23, among others. In other embodiments, non-zeolite catalysts may be used; for example, WOx/ZrO2, aluminum phosphates, etc. In some embodiments, the catalyst may comprise a metal and/or a metal oxide chosen from among nickel, palladium, platinum, titanium, vanadium, chromium, manganese, iron, cobalt, zinc, copper, gallium, the rare earth elements, i.e., elements 57-71, cerium, zirconium, and/or any of their oxides, or some combination thereof. In addition, in some cases, properties of the catalysts (e.g., pore structure, type and/or number of acid sites, etc.) may be chosen to selectively produce a desired product.

The molecular sieve for use herein or the catalyst composition comprising same may be thermally treated at high temperatures. This thermal treatment is generally performed by heating at a temperature of at least 370° C. for a least 1 minute and generally not longer than 20 hours (typically in an oxygen containing atmosphere, preferably air). While sub atmospheric pressure can be employed for the thermal treatment, atmospheric pressure is desired for reasons of convenience. The thermal treatment can be performed at a temperature up to about 925° C. The thermally treated product is particularly useful in the present process.

For the catalyst composition useful in this invention, the suitable molecular sieve may be employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite, kieselguhr and combinations thereof. The relative proportion of suitable crystalline molecular sieve of the total catalyst composition may vary widely with the molecular sieve content ranging from 30 to 90 percent by weight and more usually in the range of 40 to 70 percent by weight of the composition. The catalyst composition may be in the form of an extrudate, beads or fluidizable microspheres.

The molecular sieve for use herein or the catalyst composition comprising it may have original cations replaced, in accordance with techniques well known in the art, at least in part, by ion exchange with hydrogen or hydrogen precursor cations and/or non-noble metal ions of Group VIII of the Periodic Table, i.e. nickel, iron, or cobalt, or some combination thereof.

Fractionation

The effluent from the catalytic pyrolysis 1 is cooled in heat exchanger 150, optionally generating steam, and then fed to a main fractionation column 200. A portion of stream 4 containing naphthalene and tars is recycled to the fractionation column 200 and another portion is taken from the bottom of the fractionation column and sent to an additional distillation column 400 for efficient separation of 3 ring species in stream 13 from the naphthalene rich stream 12 that may optionally contain xylenols to reach the ending boiling point target of no greater than 350° C., or preferably no greater than 320° C. as described above. Optionally, at least a portion of streams 3 or 13, or some combination thereof can be returned to the feed of the catalytic pyrolysis process for conversion into additional valuable products. Optionally, at least a portion of streams 3 or 13, or at least a portion of the fraction remaining after the fraction boiling below 320, or 330, or 340, or 350° C. recovered in step a) has been removed, or some combination thereof can be hydrocracked in a hydrocracking process.

Ending boiling point is fixed regarding the necessity to keep some di aromatics in the residual part to preserve its viscosity at a level compatible with a good flowability. Otherwise, the residual part will be too refractory to warranty the operability of the fractionation system. This aspect is very specific to the kind of products generated through catalytic pyrolysis process that are mostly constituted of aromatic components leading to unusual high viscosity levels.

After removal of the materials that boil at 180° C. and lower, the mixture may comprise at least 25, or at least 35, or at least 40, or from 25 to 90, or from 35 to 80, or from 40 to 75 wt % sum of naphthalene, substituted naphthalenes, naphthalenols, methyl naphthalenols, and naphthalene diols, and at least 3, or at least 5, or at least 6, or from 3 to 15, or from 5 to 10, or from 6 to 8 weight % xylenols, and less than 15, or less than 10, or less than 5, or from 0.01 to 20, or from 1 to 15, or from 5 to 13 weight % the sum of phenanthrene, anthracene, and other materials.

Naphtalenic Rich Cut and External Distillate Cuts Hydrogenation

Figure 2:
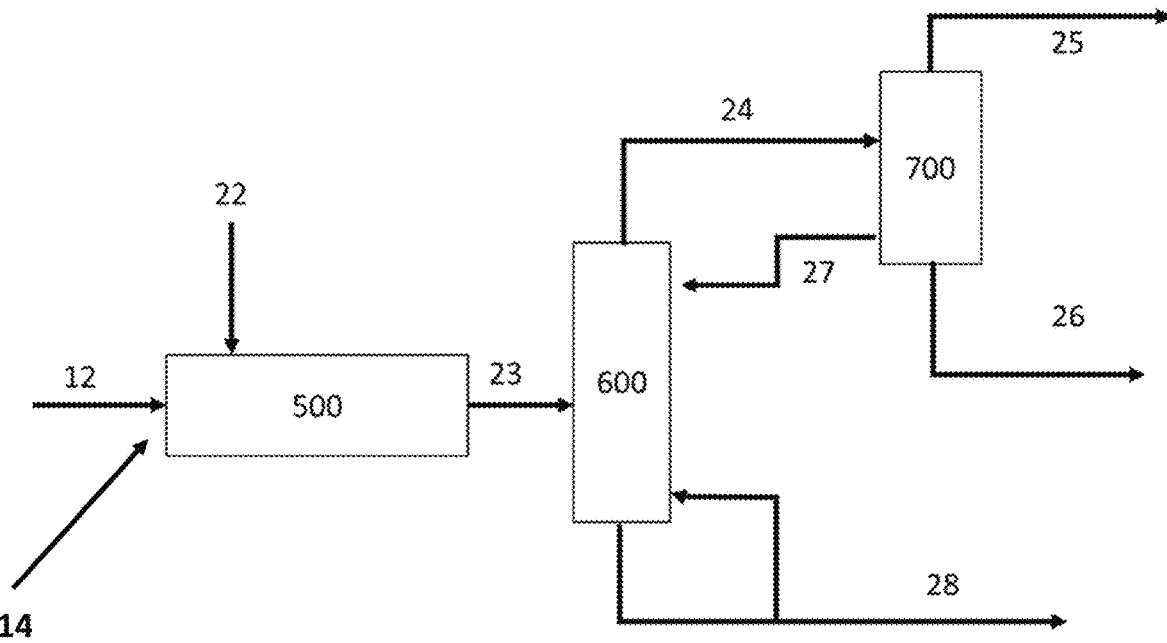
FIG. 2 shows a block flow illustration of various features of the inventive process.

FIG. 2 is a conceptual block flow diagram that shows the hydrogenation of the naphthalene-rich stream after blending with any less aromatic contained distillate cuts to cycloalkanes using hydrogen to produce a stream containing less than 5%, or less than 3%, or less than 1% of naphthalenic species.

The sources of external distillate cuts are defined by a boiling point range compatible with diesel specification and presenting other molecules than aromatics like naphthenes, paraffins and others. As an example but not limiting to, these external distillate cuts could be a Straight Run Gasoil coming from the atmospheric distillation of the crude oil or a mixture of a Straight Run Gasoil and Light Cycle Oil (LCO) coming from the fluid catalytic cracking unit. Both materials are typically the main source of diesel in a refinery after adequate up grading. Other distillate cuts can be considered as any bio sourced distillate like HVO or resulting from fat and biomass conversion. Their addition to the naphthalene rich oil base has to reduce the total aromatic content of the blend under 60 wt %. To achieve this characteristic, the external distillate cut proportion in the blend of step d) is preferably above 40 wt %, preferably above 50%, above 70 wt % and between 80 to 100 wt %.

The exotherm of hydrogenation is therefore moderated by limiting the aromatic content of the blend to a maximum value through external distillate cuts adding presenting less aromatic content than the naphthenic rich cut one.

The exotherm of hydrogenation is also moderated to a lower extent by recycling the product of the hydrogenation to dilute the feed to the hydrogenation reactor and or by using the product of the hydrogenation as a liquid quench at one or more points along the reactor. Design of the hydrogenation units are easily done by those familiar with the art of hydrogenation. The reactor can incorporate features to control the exotherm of hydrogenation in complement to the blending effect typically practiced by those skilled in the art. These features can be chosen from among: 1) recycle of cooled hydrogen 2) dilution of the feed to limit the percentage of hydrogen added to the total mass of feed, 3) introduction of "quench fluid" at various points in the reactor, whereby the heat of vaporization of the liquid is used to temper the exotherm, or some combination thereof. Such quench liquid is typically derived from the product stream, either before or after removal of more volatile components.

In FIG. 2 one embodiment of the naphthalene-rich stream hydrogenation and purification process is presented. A naphthalene-rich stream, optionally containing xylenols, 12, such as that produced from biomass by the processes in FIG. 1, or similar processes, is passed to a hydrogenation reactor 500 along with hydrogen 22 and any sources of distillate cuts 14 presenting less aromatics than stream 12. In the hydrogenation reactor the naphthalene-rich stream is hydrogenated to tetralins, decalins, other naphthenes, and similar cycloalkane materials, which mixture 23 is passed to purification column 600. Any xylenols present will be hydrogenated to benzene, toluene, xylenes, and naphthenes in this reactor as well. In purification column 600 the light materials 24 are passed to a decanter/reflux drum 700 where the xylenes are optionally recovered in stream 25, a portion of the mixture 27 is returned to the separation column, and a water fraction 26 is separated. Stream 27 typically comprises tetralins, decalins, other naphtenes, as well as some xylenes, and some water and the light species resulting from the hydrogenation of the co feed 14. The diesel fuel 28 is separated and recovered as product. A slipstream of the diesel fuel 28 is returned to the separation column. Returning some of the heavier materials to column 600 can improve the efficiency and yield. The naphthalene rich cut comprises at least 25, or at least 35, or at least 40, or from 25 to 90, or from 35 to 80, or from 40 to 75 wt % sum of naphthalene, substituted naphthalenes, naphthalenols, methyl naphthalenols, and naphthalene diols, and at least 3, or at least 5, or at least 6, or from 3 to 15, or from 5 to 10, or from 6 to 8 weight % xylenols, and less than 15, or less than 10, or less than 5, or from 0.01 to 20, or from 1 to 15, or from 5 to 13 weight % the sum of phenanthrene, anthracene, and other materials. The naphthalene rich stream 12 may comprise at least 25, or at least 35, or at least 40, or from 25 to 65, or from 35 to 60, or from 40 to 55 volume % the sum of naphthalene, substituted naphthalenes, and naphthols, and at least 3, or at least 5, or at least 6, or from 3 to 15, or from 5 to 10, or from 6 to 8 weight % xylenols, and less than 15, or less than 10, or less than 5, or from 0.01 to 20, or from 1 to 15, or from 5 to 13 weight % the sum of phenanthrene, anthracene, and other materials In FIG. 2, the hydrogenation is done in one step, and the resulting product is fed to a distillation column to remove water derived from hydrogenation of oxygen-containing two-ring species and other compounds, and to remove xylenes resulting from the deoxygenation of xylenols, which can be fed to the purification scheme as described in US2020/0165527. The bottoms from the distillation column 28 can then be sold as a diesel fuel.

The renewable part of this diesel fuel corresponds to the proportion of the renewable naphthalene rich cut in the blend and the hydrogen consumption used to achieve the hydrogenation if this hydrogen is not renewable. If the hydrogen is derived from the catalytic pyrolysis of biomass, the biomass derived content of the fuel produced is increased by the hydrogen consumption. Carbon 14 dating is a common method to determine the exact proportion of renewable material in a blend In each of the embodiments presented in FIG. 1 and FIG. 2, a portion of the unreacted hydrogen is optionally collected from the overheads of the hydrogenation reactor 500, or separation column 600, or some combination thereof, and recycled to the one or more hydrogenation reactor(s).

Fraction boiling at or above 180° C. recovered comprises xylenols that are converted to xylenes, and optionally cracked to benzene and toluene. Optionally benzene and toluene, are separated and combined with a BTX stream recovered from the catalytic fast pyrolysis process.

Optionally, in FIG. 2, the hydrogenation in 500 can be divided into two steps, whereby the hydrogenation reactor 500 effectively comprises a hydrogenation to produce a partially hydrogenated stream by operation at lower pressure to partially hydrogenate aromatic rings and reduce xylenols to benzene, toluene, and xylenes, and reduce naphthalenes to naphthenes, and a second reactor (not shown) that further hydrogenates aromatics by operation at higher pressure. In this case the first hydrogenation can be operated within the range of 2.0 to 7.0 MPa with a CoMo containing catalyst. An optional distillation can be inserted after the first hydrogenation step of 500 to remove the water of reaction as well as the xylenes. The second hydrogenation process in 500 (not shown) completes the hydrogenation of the aromatics to produce cycloalkanes, and can use a noble metal catalyst such as one containing Pd, or Pt, or a combination of the two. The second hydrogenation can be operated at a similar, but higher, pressure as the first hydrogenation, within the range from 4.0 to 10.0 MPa. This combination of low pressure hydrogenation in 500, optional distillation (not shown), and higher pressure hydrogenation will produce a product that would not need any additional purification. An alternative embodiment is to conduct the distillation after the second hydrogenation step in 500.

The hydrogenation may be conducted by contacting the liquid with a H2 containing gas at a pressure hydrogen pressures from 1.5 to 10 MPa. Preferably two operating modes can be implemented:

From 1.5 to 4.0 MPa, preferably from 2.5 to 4.0 MPa,
From 4.0 to 10 MPa, preferably from 7.0 to 10 MPa.

Process conditions for hydrogenation include temperatures of at least 280° C., or at least 300° C., or at least 320° C., or from 280 to 450° C., or from 300 to 400° C., or from 320 to 350° C. in the presence of a solid catalyst.

Solid catalysts useful for the hydrogenation process include Ni/Mo, Co/Mo, optionally containing Fe, Cu, Zn, Ag, Pt, Pd, Ru, Rh, Ir, Mo, W, or combinations thereof, deposited on oxide supports including oxides of Al, Si, Ti, Zr, Th, Mg, Ca, or some combination of these, either as crystalline solids or as amorphous mixtures. The hydrogenation can be carried out in a fixed bed, trickle bed, catalytic distillation reactor, multi-tubular reactor, or fluid bed reactor, with counter- or co-current flow of feed and hydrogen.

Process conditions for hydrogenation include Liquid hourly space velocities of at least 0.5, or at least 1, or at least 2, or no more than 10, or no more than 5, or no more than 3, or from 0.5 to 5, or 1 to 4, or 2 to 3 hr-1, hydrogen circulation rates for hydrogenation of at least 70, or at least 100, or at least 300, or from 70 to 1000, or 7000 to 800, or 100 to 700 Nm3 of H2 per m3 of liquid feed. Typical catalysts for hydrogenation include CoMo on alumina support, NiMo on alumina support, or combinations thereof.

Recovery of the products of the hydrogenation of the mixed aromatics may produce a product mixture comprising compounds chosen from among the cyclohexanes including cyclohexane, alkylated cyclohexanes, tetralins, alkylated tetralins, decalins, and Product diesel fuel presents less than 10%, or less than 5%, or less than 2%, or less than 1% of the aromatic carbon-carbon bonds in the aromatic rings in the hydrotreated product.

In one embodiment the product diesel fuel comprises less than 0.4, or less than 0.1 weight %, or less than 100 ppm, or less than 25 ppm, or from 0.1 to 4000 ppm, or from 1 to 1000 ppm olefins by weight, and less than 10, or less than 5, or less than 2 ppm, or from 0.1 to ppm, or from 0.2 to 5 ppm by weight sulfur, and less than 10, or less than 5, or less than 2 ppm, or from 0.1 to 10 ppm, or from 0.2 to 5 ppm by weight nitrogen, and less than 1, or less than 0.1, or less than 0.01 weight %, or less than 100 ppm, or less than 10 ppm, or less than 1 ppm, or from 0.1 to 10000 ppm, or from 0.2 to 1000 ppm oxygen by weight.

The following Examples demonstrate the present invention and its capability for use. The invention is capable of other and different embodiments, and its several details are capable of modifications in various apparent respects, without departing from the spirit and scope of the invention. Accordingly, the Examples are to be regarded as illustrative in nature and not as restrictive. All parts and percentages are by weight and all temperatures are set forth uncorrected in degrees Celcius, unless otherwise indicated. When numerical lower limits and numerical upper limits are listed herein, ranges from any lower limit to any upper limit are contemplated.

The entire disclosures of all applications, patents and publications, and copending U.S. Provisional Application are incorporated by reference herein.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

EXAMPLES

Example 1: Renewable Naphthalene Rich Cut Ending Boiling Point Management

Example 1 illustrates how ending boiling point of the renewable naphthalene rich cut must be chosen to warranty the processability of the system.

Figure 3:
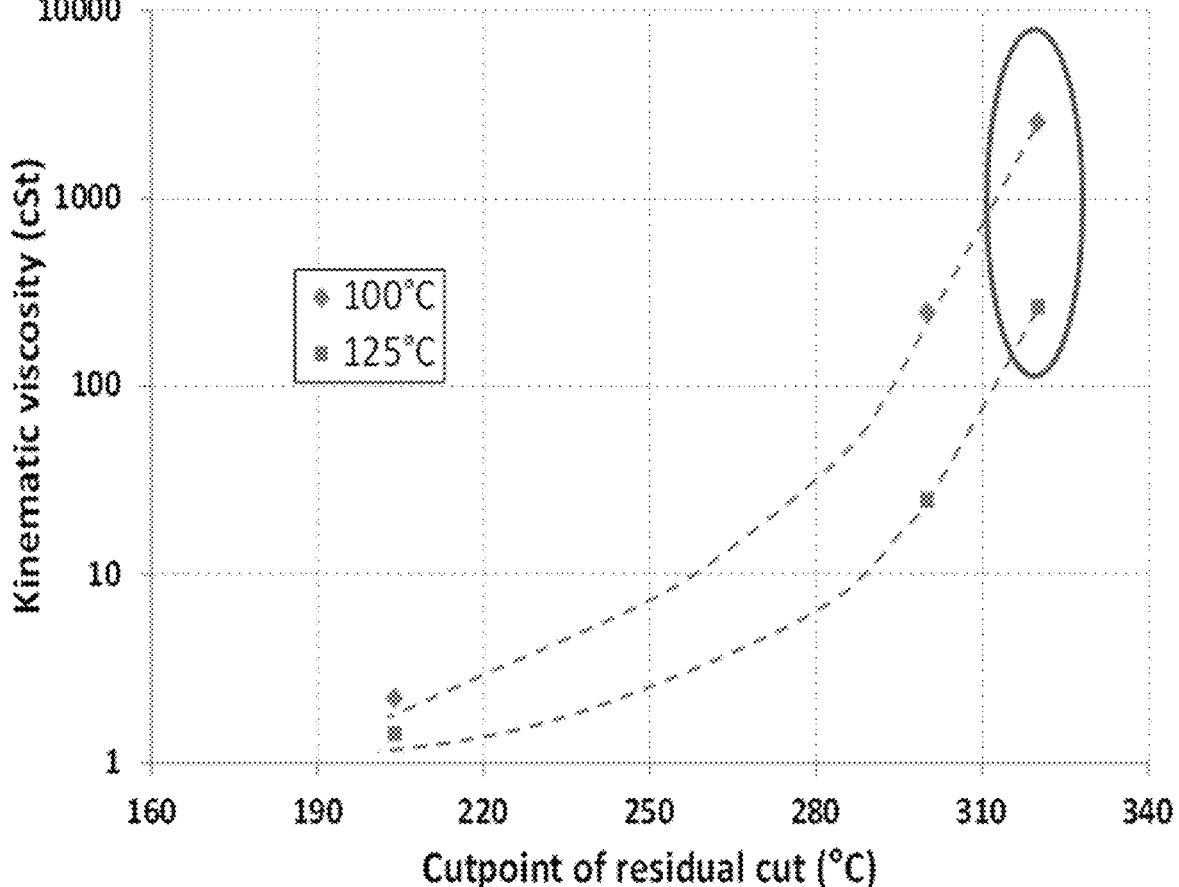
FIG. 3 shows residual cut viscosity as a function of residual initial boiling point.

Residual cut kinetic viscosity is presented on FIG. 3 as a function of the residual cut initial boiling point. As a reminder, Residual initial boiling point corresponds about to the naphthalene rich cut ending boiling point.

Plotted data have been obtained under certain catalytic pyrolysis severities and varies depending on the considered case.

This example clearly demonstrates that, for this case, above 320° C., the residual cut viscosity increases significantly reaching too high values to easily make processable this cut in a commercial system.

Limiting the ending boiling point of the naphthalene rich cut is therefore mandatory beyond final product specification concerns.

Example 2: Naphthalene Rich Cut Aromatic Content Management with SR GO Feed Introduction to Limit Hydrotreatment Reaction Exotherm Based on example 1, a naphthalene rich cut from catalytic pyrolysis process presenting a boiling point range from 204 to 320° C. is considered. Its composition is presented in Table 1

TABLE 1

| Naphthalene rich cut composition | |
| --- | --- |
| | wt %<br>Naphthalene rich cut<br>Boiling Range, ° C.<br>204-320 |
| Phenol | 0.1 |
| MethylPhenol | 4.4 |
| DimethylPhenol | 6.1 |
| EthylPhenol | 0.2 |
| C3-Phenol | 1.5 |
| C4-Phenol | 0.3 |
| Benzofuran | 0.0 |
| MethylBenzofuran | 0.5 |
| C2-Benzofuran | 0.4 |
| Naphthalene | 12.2 |
| MethylNaphthalene | 25.3 |
| C2-Naphthalene | 13.0 |
| C3-Naphthalene | 5.7 |

TABLE 1-continued

| Naphthalene rich cut composition | |
| --- | --- |
| | wt %<br>Naphthalene rich cut<br>Boiling Range, ° C.<br>204-320 |
| Naphthalenol | 4.5 |
| MethylNaphthalenol | 3.5 |
| C2-Naphthalenol | 0.9 |
| Anthracene | — |

Renewable naphthalene rich cut is therefore composed of 100% of aromatics and of about 65 wt % of two ring aromatic species.

Table 2 gives compositions and properties for a SR Gasoil feedstock and for its blends when mixed with a renewable naphthalene rich cut. Illustration is given for two blends containing 90/10 and 80/20 wt % of respectively SR Gasoil/ naphthalene rich cut.

Compared to the naphthalene rich cut, the blends with SR GO leads to significant lower aromatic contents (from about 100% to 35 and 43 wt %) and particularly two ring aromatics species (from about 65 to 18 and 28 wt %).

Knowing aromatics and particularly di aromatics hydrogenation generates high exotherm, the introduction of SR Gasoil is an effective solution to manage the excess of heat generated during the hydrotreatment and its detrimental effects.

At this stage, Example 1 and Example 2 clearly demonstrate the effectiveness of the proposed combined solutions to make possible the renewable naphthalene rich cut upgrading.

Example 3: Naphthalene Rich Cut Aromatic Content Management with SR GO/LCO Feed Introduction to Limit Hydrotreatment Reaction Exotherm Example 3 illustrates the same way the effects highlighted in example 2 but this time with a SR Gasoil feed added with

TABLE 2

| SR GO and blends with Naphathlene rich cut properties and compositions | | | | | |
| --- | --- | --- | --- | --- | --- |
| | Sample | | SR GO | SR GO/Naphthalenic rich cut (90/10) | SR GO/Naphthalenic rich cut (80/20) |
| Simulated | IBP | ° C. | 135.2 | 139.7 | 142.5 |
| distillation | 5 wt % of distillation | ° C. | 188.6 | 190.9 | 189.8 |
| | 10 wt % of distillation | ° C. | 215 | 209.7 | 208.9 |
| | 20 wt % of distillation | ° C. | 246.9 | 235.2 | 230.9 |
| | 30 wt % of distillation | ° C. | 266.6 | 256.3 | 249.4 |
| | 40 wt % of distillation | ° C. | 284.1 | 275.1 | 266.7 |
| | 50 wt % of distillation | ° C. | 300.4 | 293.2 | 285.1 |
| | 60 wt % of distillation | ° C. | 315.3 | 308.6 | 301.6 |
| | 70 wt % of distillation | ° C. | 330.5 | 326.1 | 318.6 |
| | 80 wt % of distillation | ° C. | 350.4 | 345.2 | 341 |
| | 90 wt % of distillation | ° C. | 373.8 | 371.2 | 368.4 |
| | 95 wt % of distillation | ° C. | 391.1 | 390.6 | 387.6 |
| | FBP | ° C. | 432.1 | 439.4 | 436.3 |
| | IBP-250° C. content | wt % | 21.4 | 25.7 | 30.5 |
| | 250-360° C. content | wt % | 63.2 | 60.2 | 57 |
| | 360° C.+ content | wt % | 15.4 | 14.1 | 12.5 |
| Global | Density at 15° C. | g/cm³ | 0.8491 | 0.8642 | 0.8801 |
| analyses | Kin. visco. at 20° C. | cSt | — | 5.8 | 5.5 |
| | Kin. visco. at 40° C. | cSt | — | 3.5 | 3.4 |
| | Cloud Point | ° C. | 0 | −1 | −2 |
| | Pour Point | ° C. | −3 | −6 | −6 |
| | Basic nitrogen | wtppm | 47.9 | 43 | 40.5 |
| | Molecular weight (SD) | g/mol | 224.1 | 213.9 | 203.7 |
| Aromatics | Aromatic Carbon (RMN) | wt % | 14 | 18.1 | 27.6 |
| | Monoaromatics (UV) | wt % | 18.08 | 18.49 | 18.66 |
| | Diaromatics (UV) | wt % | 5.69 | 14.86 | 23.07 |
| | Triaromatics+ (UV) | wt % | 1.51 | 2.03 | 2.57 |
| | Total aromatics (UV) | wt % | 25.28 | 35.39 | 44.31 |
| Pack | Monoaromatics (PIR) | wt % | 17.82 | 16.83 | 15.57 |
| PIR | Diaromatics+ (PIR) | wt % | 7.25 | 18.06 | 27.86 |
| | Total aromatics (PIR) | wt % | 25.07 | 34.89 | 43.43 |
| | Aromatic Carbon (PIR) | % C | 12.7 | 18 | 23.7 |
| | H (PIR) | wt % | 13.31 | 12.76 | 12.26 |
| | Cetane (PIR) | — | 52.4 | 52.8 | 51.8 |
| Elemental | C | wt % | 86.3 | 86.39 | 86.61 |
| | H | wt % | 13.27 | 12.59 | 11.99 |
| | N | wtppm | 96.5 | 97.1 | 98.7 |
| | O | wt % | <0.1 | 0.63 | 1.06 |
| | S | wt % | 0.4189 | 0.3781 | 0.3331 |
| | H/C | at/at | 1.85 | 1.75 | 1.66 | an LCO one. Conclusions are the same ones, but this example shows multiple external distillate feeds can be considered.

Table 3 gives compositions and properties for a SR Gasoil and LCO feedstock (respectively 65 and 35 wt %) and for its blends when mixed with a renewable naphthalene rich cut. Illustration is given for blends containing 90/10 and 80/20 wt % of respectively SR Gasoil&LCO/naphthalene rich cut.

bottom and analyzed off-line. The process is allowed to line-out to a steady state before commencing product collection and analysis.

Table 4 shows hydrotreatment operating conditions for the case naphthalene rich cut is mixed with SR GO and with SR GO+LCO.

TABLE 3

SR GO/LCO and blends with Naphathlene rich cut properties and compositions

| | Sample | | SR GO/LCO (65/35) | SR GO/LCO/ Naphthalenic rich cut (90/10) | SR GO/LCO/ Naphthalenic rich cut (80/20) |
|---|---|---|---|---|---|
| Simulated | IBP | ° C. | 136.3 | 140.7 | 145.8 |
| distillation | 5 wt % of distillation | ° C. | 193.8 | 195.5 | 194.9 |
| | 10 wt % of distillation | ° C. | 218.7 | 212.9 | 209.3 |
| | 20 wt % of distillation | ° C. | 248.6 | 236.9 | 231.1 |
| | 30 wt % of distillation | ° C. | 266.9 | 256.7 | 250.1 |
| | 40 wt % of distillation | ° C. | 283 | 275.1 | 267 |
| | 50 wt % of distillation | ° C. | 299.8 | 292.5 | 283.9 |
| | 60 wt % of distillation | ° C. | 315.1 | 308.2 | 301.2 |
| | 70 wt % of distillation | ° C. | 330.5 | 325.7 | 318.6 |
| | 80 wt % of distillation | ° C. | 350.1 | 344.3 | 340.2 |
| | 90 wt % of distillation | ° C. | 374 | 369.7 | 367 |
| | 95 wt % of distillation | ° C. | 392.1 | 388.7 | 385.9 |
| | FBP | ° C. | 448.1 | 436.8 | 438.2 |
| | IBP-250° C. content | wt % | 20.8 | 24.9 | 29.9 |
| | 250-360° C. content | wt % | 63.9 | 61.6 | 58 |
| | 360° C.+ content | wt % | 15.4 | 13.5 | 12.1 |
| Global | Density at 15° C. | g/cm$^3$ | 0.8708 | 0.8847 | 0.899 |
| analyses | Kin. visco. at 20° C. | cSt | — | 5.8 | 5.5 |
| | Kin. visco. at 40° C. | cSt | — | 3.5 | 3.3 |
| | Cloud Point | ° C. | −4 | −1 | 0 |
| | Pour Point | ° C. | −6 | −9 | −9 |
| | Basic nitrogen | wtppm | 62.5 | 56 | 51 |
| | Molecular weight (SD) | g/mol | 219.1 | 209.1 | 198.6 |
| Aromatics | Aromatic Carbon (RMN) | wt % | 22.1 | 28.4 | 34.5 |
| | Monoaromatics (UV) | wt % | 20.45 | 20.54 | 20.3 |
| | Diaromatics (UV) | wt % | 13.77 | 21.33 | 28.24 |
| | Triaromatics+ (UV) | wt % | 4.33 | 4.5 | 4.58 |
| | Total aromatics (UV) | wt % | 38.55 | 46.36 | 53.11 |
| Pack | Monoaromatics (PIR) | wt % | 20.24 | 18.79 | 17.14 |
| PIR | Diaromatics+ (PIR) | wt % | 17.48 | 26.68 | 34.9 |
| | Total aromatics (PIR) | wt % | 37.72 | 45.47 | 52.04 |
| | Aromatic Carbon (PIR) | % C | 21.9 | 26.3 | 31.3 |
| | H (PIR) | wt % | 12.49 | 12.04 | 11.63 |
| | Cetane (PIR) | — | — | 45.2 | 46 | 45.9 |
| Elemental | C | wt % | 86.72 | 86.82 | 87 |
| | H | wt % | 12.48 | 12.01 | 11.42 |
| | N | wtppm | 380 | 308.6 | 288.1 |
| | O | wt % | 0.12 | 0.58 | 1.06 |
| | S | wt % | 0.64 | 0.5578 | 0.4864 |
| | H/C | at/at | 1.73 | 1.66 | 1.58 |

Example 4: Hydrotreatment Step to Make on Spec Renewable Diesel

Hydrogenation experiments were carried out on the selected feed in a 33 cc downflow packed bed reactor unit with independent feedstock and product recovery sections. The catalyst was a commercial NiMo/$Al_2O_3$ and CoMo/$Al_2O_3$ catalyst that was fully sulfided in situ before initiating the hydrogenation. Reactor effluents are depressurized and send to a H2 stripper. The gas fraction is recovered at the stripper top and analyzed through on-line gas chromatography. The liquid fraction is recovered from the stripper

TABLE 4

HDT operating conditions

| | Catalyst Type | P (barg) | T (° C.) | LHSV (h − 1) | H2/feed at inlet (Nl/l) |
|---|---|---|---|---|---|
| Cond 1: For blend with SR GO | CoMo | 30 | 350 | 1 | 280 |
| Cond 2: for blend with SR GO & LCO | NiMo | 80 | 340 | 1 | 740 |

Higher pressure level is required in presence of LCO as much refractory materials are present.

Table 5 and Table 6 present the blends properties after the hydrotreatment compared to the US specifications respectively for the case with SR GO and with SR GO+LCO. As easily understood, these properties can be improved to fit European specifications much restrictive than US ones by adjusting the hydrotreatment operating conditions.

TABLE 5

Product properties for SR GO case

| Main diesel specifications | unit | US Spec | SR GO + 10 wt % Naphthalene rich cut | SR GO + 20 wt % Naphthalene rich cut |
|---|---|---|---|---|
| Density at 15° C. | g/cm³ | <0.876 | 0.8504 | 0.8597 |
| Cetane | (—) | >41 | 48.2 | 42.8 |
| Sulfur | wtppm | <15 | 12 | 12 |
| Polycyclic aromatic content | wt % | — | 5.6 | 7.9 |
| Cold Filter Plugging Point | ° C. | <−6 | −7 | −8 |
| Viscosity @40° C. | cSt | 1.9-4.1 | 3.2 | 2.9 |

TABLE 6

Product properties for SR GO + LCO case

| Main diesel specifications | unit | US Spec | SR GO/LCO + 10 wt % Naphthalene rich cut | SR GO/LCO + 20 wt % Naphthalene rich cut |
|---|---|---|---|---|
| Density at 15° C. | g/cm³ | <0.876 | 0.8434 | 0.847 |
| Cetane | (—) | >41 | 51.5 | 48.5 |
| Sulfur | wtppm | <15 | 3.6 | 5.1 |
| Polycyclic aromatic content | wt % | — | 0.59 | 0.64 |
| Cold Filter Plugging Point | ° C. | <−6 | −7 | −8 |
| Viscosity @40° C. | cSt | 1.9-4.1 | 3.1 | 2.8 |

Table 7 presents some properties of the product resulting from the direct naphthalene rich cut (204-320° C.) hydrotreatment under the same conditions as presented in Table 4

TABLE 7

Hydrotreated Naphthalene rich cut properties

| Main diesel specifications | unit | US Spec | Naphthalene rich cut Cond 1 | Naphthalene rich cut Cond 2 |
|---|---|---|---|---|
| Density at 15° C. | g/cm³ | <0.876 | 0.957 | 0.891 |
| Polycyclic aromatic content | wt % | — | 35.3 | 1.6 |
| Viscosity @40° C. | cSt | 1.9-4.1 | 1.52 | 1.53 |

Beyond the reaction exotherm concern, these results clearly indicate that much severe HDT conditions are mandatory to bring this feed at diesel commercial specification and this due to the initial high aromatic concentration.

In conclusion, Example 4 illustrates that the combination of the naphthalene rich cut ending boiling point management combined with its total aromatic content limitation by mixing with adequate distillate cut proportion make possible its upgrading into renewable diesel fitting commercial specifications.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparing renewable diesel fuel, comprising preparing renewable diesel fuel by: a) fractionating a mixture comprising renewable aromatics to produce a first fraction boiling at 180° C. to 350° C. at atmospheric conditions, and a fraction boiling below the boiling point of the first fraction, blending at least a portion of the first fraction with at least one distillate cut having lower aromatic content than the first fraction, and b) hydrogenating a blend of the first fraction and distillate cut having lower aromatic content to produce a hydrogenated fraction comprising a renewable diesel fuel; and wherein the distillate cut is a straight run gasoil, or a mixture of straight run gasoil and light cycle oil.

2. The process of claim 1, comprising
a) fractionating a mixture comprising renewable aromatics to produce a first fraction boiling at or above 180° C. at atmospheric conditions, and a fraction boiling below the first fraction, blending at least a portion of the first fraction with at least one distillate cut having lower aromatic content than the first fraction, and
b) hydrogenating a blend of the first fraction and distillate cut.

3. The process of claim 1, wherein the mixture comprising renewable aromatics is the product of pyrolysis of biomass.

4. A process for preparing renewable diesel fuel, comprising:
a) feeding biomass, catalyst composition, and transport fluid to a catalytic pyrolysis process fluidized bed reactor maintained at reaction conditions to manufacture a raw fluid product stream,
b) feeding the raw fluid product stream of a) to a solids separation and stripping system to produce separated solids and a fluid product stream,
c) feeding the fluid product stream of b) to a fractionation system in order to recover a first fraction boiling at or above 180° C. to 350° C.,
d) mixing the first fraction of c) with at least one distillate cut having lower aromatic content than the first fraction in order to dilute the aromatic content of a resultant mixture below 60 wt. %, wherein the at least one distillate cut has a boiling point range compatible with diesel fuel, wherein the distillate cut having lower aromatic content than the first fraction proportion in the blend of step d) is above 40 wt %,
e) hydrogenating at least a portion of a blend generated in d) with hydrogen at hydrogenation conditions to produce a hydrogenated fraction,
f) optionally recovering diesel fuel comprising naphthenes from the hydrogenated fraction of e).

5. The process of claim 4, comprising in c) feeding the fluid product stream of b) to a fractionation system in order to recover a first fraction boiling at or above 180° C.

6. The process of claim 4, wherein d) comprises mixing the first fraction of c) with at least one distillate cut having lower aromatic content than the first fraction in order to dilute the aromatic content of a resultant mixture below 50 wt. %.

7. The process of claim 4, wherein d) comprises mixing the first fraction of c) with at least one distillate cut having lower aromatic content than the first fraction in order to dilute the aromatic content of a resultant mixture below 40 wt. %.

8. The process of claim 4, wherein the biomass is wood, forestry waste, corn stover, agricultural solid waste, municipal solid waste, digestate, food waste, animal waste, carbohydrate, lignocellulosic material, xylitol, glucose, cellobiose, hemicellulose, lignin, or combinations thereof.

9. The process of claim 4, wherein the distillate cut is a straight run gasoil, or a mixture of straight run gasoil and light cycle oil.

10. The process of claim 4, wherein the raw fluid product stream of a) is a naphthalene-rich oil.

11. The process of claim 4, wherein hydrogenation converts compounds having aromatic rings to naphthenes.

12. The process of claim 4, wherein in a) pyrolysis is conducted with an operating temperature of 300° C. to 1000° C., a pressure of 0.1 to 3.0 MPa, and a solid catalyst/biomass mass ratio of 0.1 to 40.

13. The process of claim 4, wherein in a) pyrolysis is conducted with a catalyst that is a crystalline molecular sieve having a silica to alumina ratio greater than 12 and an internal porosity with average pore sizes less than 10 nm.

14. The process of claim 13, wherein the catalyst is ZSM-5, ZSM-5, ZSM-11, ZSM-12, ZSM-22, ZSM-23, ZSM-35, ZSM-48, ZSM-50 or a mixture thereof.

15. The process of claim 4, wherein in c) the first fraction comprises at least 25 vol. % naphthalene and substituted naphthalenes.

16. The process of claim 4, wherein the hydrogenated fraction in e) comprises tetralins, decalins and naphthenes.

17. The process of claim 4, further comprising recycling a portion of the hydrogenated fraction from e) to pyrolysis in a).

18. A diesel fuel containing renewable fuel, produced by a process according to claim 4.

* * * * *